Patented Dec. 3, 1929

1,737,918

UNITED STATES PATENT OFFICE

OSCAR A. CHERRY, OF CHICAGO, ILLINOIS, ASSIGNOR TO ECONOMY FUSE AND MANUFACTURING COMPANY, OF CHICAGO, ILLINOIS, A CORPORATION OF NEW YORK

UREA AND FORMALDEHYDE CONDENSATION PRODUCTS

No Drawing.    Application filed May 23, 1927. Serial No. 193,740.

This invention relates to the processes of making condensation products from formaldehyde or its polymers and urea, thiourea or its derivatives, and the products made thereby.

It has been found in condensing urea, thiourea or its derivatives with formaldehyde or its polymers, that various products are formed depending upon several sets of conditions to which the reaction is subjected, which are: first, the ratio of the amounts of urea and formaldehyde employed, and secondly, upon the condition prevailing as to whether or not the condensation is conducted in the presence of an alkaline, neutral or acid solution.

It has been determined by past experiments that several different substances are formed as a result of condensing urea with formaldehyde depending upon the prevailing conditions referred to, and that among these products are the following: first, methylene urea $CO(NH)_2CH_2$ and dimethylene urea $CO(NCH_2)_2$; secondly, an intermediate product formed from two molecules of urea and three molecules of formaldehyde with the elimination of two molecules of water, the formula of which is $C_5H_{10}N_4O_3$; and thirdly, monomethylol urea which is $C_2H_6O_2N_2$ and dimethylol urea $C_3H_8O_3N_2$.

The first of these, that is, the methylene urea and the dimethylene urea are quite insoluble in all ordinary solvents and are found to decompose under the action of high temperature without melting. The second or intermediate compound is a thick, white, granular precipitate which is not soluble in any solvent, but will be decomposed by strong acids and is unaffected by alkalies. The third group of monomethylol urea and dimethylol urea are both easily soluble in cold water and in alcohol but are insoluble in ether.

It is desirable in the formation of condensation products to be utilized commercially, to avoid the formation of a first and second of these products, in that they consist of minute, white granules having an amorphous structure and are infusible and insoluble in ordinary solvents and are of no known commercial value, but on the other hand it is desirable to form the monomethylol urea or the dimethylol urea or a mixture of these in that these substances are soluble and form a solution which is capable of, upon subsequent heat treatment, polymerizing to form a colloid which upon a continuation of the heat treatment becomes viscid, gradually insoluble and finally gelatinized into a hard, insoluble, infusible vitreous mass.

In view of this, it is desirable to note particularly the conditions which, when prevailing will promote the formation of the monomethylol urea and dimethylol urea to the exclusion of the undesirable condensation products. It has been found in the presence of slightly acid solutions that either methylene urea or dimethylene urea are formed depending upon the amount of formaldehyde employed relative to the amount of urea used, provided however, that the formaldehyde used is less than five parts to one part of urea, but on the contrary, if an excessive amount of formaldehyde, namely, approximately more than five times that of urea is employed, no precipitate is formed, but rather a solution which is capable of being subsequently gelatinized and hardened, is formed. In addition, it has been learned that it is not necessary to use this excessive amount of formaldehyde to form an initial condensation product which is soluble, provided the solution, in the presence of which the condensing reaction takes place, is basic rather than acid.

As above set forth, the initial condensation product is found to be a soluble substance forming a solution which, on standing in the atmosphere or being heat treated is capable of being gradually gelatinized to form a viscid, intermediate product and finally hardened into an insoluble and infusible substance. Although, the formation when relatively small amounts of formaldehyde to that of urea are employed depends upon the addition of a base to the solution to form the initial product, the final hardening is accomplished by rendering a mass slightly acid which may be effected by any one of several well known methods.

Proceeding with this information I have found that the underlying principle which effects the condensation reaction between the formaldehyde and urea is that of the hydrogen ion concentration of the solution to which the condensation action is exposed. I have learned further that very desirable results can be had in condensing urea with formaldehyde when the condensation action is conducted in the presence of a solution, the hydrogen ion concentration of which is approximately $1 \times 10^{-5}$. When the condensation reaction is conducted at this concentration, a condensation product soluble in water is obtained. As the reaction proceeds, this product passes into a colloidally dispersed form which is probably a hydrated form of dimethylol urea. Upon removal of water by distillation and by the final heat treatment a jelly-like mass is obtained which finally passes into a hard, toughened product which under some circumstances, depending upon the particular formula employed, will be transparent.

It is important to consider in this connection, that the hydrogen ion concentration of an absolutely neutral solution is $1 \times 10^{-7}$ and that I have found according to this invention, that it is possible to form the soluble products of condensation without resorting to the employment of basic solutions or even neutral solutions or to the relatively large amounts of formaldehyde heretofore employed, but with solutions which are within a limited degree acid, inasmuch as a hydrogen ion concentration of $1 \times 10^{-5}$ is a slightly acid solution.

In addition to the fact that this ion concentration is proper for the formation of the initial product, it is also proper for the formation of the intermediate and final products from the initial product in that the mass is already slightly acid. In practicing my invention, any one of several methods may be resorted to, the prevailing feature being that the proper hydrogen ion concentration be supplied initially at the time the condensation reaction is commenced.

It is well known that formaldehyde solutions contain, in addition to formaldehyde, an appreciable amount usually about $\frac{1}{10}$th of 1 per cent by weight of formic acid and consequently solutions of the condensation products made up solely of urea and formaldehyde are actually acid solutions which under ordinary circumstances, will have a hydrogen ion concentration of approximately $1 \times 10^{-3}$. If such is the case, in order to form condensation products according to the processes contemplated by my invention, it is necessary to change the hydrogen ion concentration from $1 \times 10^{-3}$ to $1 \times 10^{-5}$ which may be done by any one of several methods to be hereinafter described. It is conceivable, however, that solutions made up of formaldehyde and urea may only contain formic acid in amount sufficient to establish the hydrogen ion concentration of approximately $1 \times 10^{-5}$ in which case it will be unnecessary to further treat the solution, but on the contrary, the condensation product formed from such a solution will be that contemplated by my invention. It is also within the scope of my invention to add a base to a solution which has a high acid concentration until the proper concentration is had by actual test.

Also, my invention contemplates the use of a metal which is introduced into the urea formaldehyde reaction and which acts to remove the formic acid by combination with it and the formation of a formate, such as zinc formate, in the event zinc is the metal employed, and that the quantity of metal selected be sufficient to provide an excess, in which case, the hydrogen ion concentration of the solution will automatically adjust itself at the desired concentration which is approximately $1 \times 10^{-5}$.

It has been found that certain neutral salts will reduce the hydrogen ion concentration of commercial formaldehyde solution from approximately $1 \times 10^{-3}$ to $1 \times 10^{-5}$ or $1 \times 10^{-5.5}$ depending upon the amount used. Among others, the neutral salts known to serve well in this capacity are manganese acetate and lead acetate. The principle of the reaction whereby these neutral salts reduce the hydrogen ion concentration is not understood, but it is found to be so by actual test. It may be that a reaction occurs whereby formic acid is replaced by acetic acid with the formation of a metallic formate as:

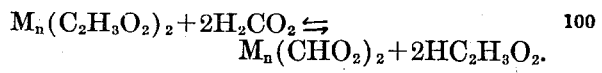
$$M_n(C_2H_3O_2)_2 + 2H_2CO_2 \leftrightarrows M_n(CHO_2)_2 + 2HC_2H_3O_2.$$

Addition of amounts of manganese acetate in excess of that required to react to the formic acid would cause a repression of the ionization of the acetic acid and thus a further decrease in the hydrogen ion concentration. This is in accordance with the observed facts. The experimental data is too limited to warrant the drawing of a definite conclusion, however. By way of example, the following are methods by which my invention may be practiced:

Process 1

Formaldehyde solution of 40% strength 400 parts are heated to boiling under a reflux condenser in the presence of 5 parts of a metal, for example zinc or nickel. The boiling is continued for 2 to 3 minutes and the solution is allowed to cool somewhat. Then 100 parts of urea are added and the solution is again heated to boiling under a reflux condenser. When the solution begins to boil the heat may be removed since the reaction which occurs is exothermic and the boiling will continue for some time without further application of heat. When ebullition ceases the solution is filtered to remove the excess metal and the clear, limpid filtrate is distilled until substantially all of the uncombined water is eliminated. The resulting product is a clear, viscous liquid which is poured into molds and is heated at a temperature which is gradually increased from 50° to 100° C. over a period of a few days or a week depending upon the size of the articles cast. The final product is a transparent, strong and very tough article, unaffected by cold water but disintegrated by boiling water. It may be machined.

If it is desired to use larger quantities of urea than those mentioned it is desirable to add the extra urea as a separate portion to avoid any possible precipitation of methylene urea or other dehydration products of dimethylol urea. For example, 100 parts of urea are added to 400 parts of formaldehyde solution which has been treated with a metal as above described and after ebullition has ceased, 20 parts additional of urea are added and the solution is again heated to boiling. After ebullition has ceased, another portion of 20 parts urea is added and the solution treated as before. Finally, another portion of 20 parts urea is added and the solution is boiled, cooled, filtered and distilled as before described. The advantage of adding the larger amount of urea is that the product obtained by distilling may be subjected to the final heat treatment with less likelihood of warping, checking, etc.

According to this process, the metal present reacts as above described to produce the hydrogen ion concentration of $1\times10^{-5}$ which concentration causes the reaction to proceed to form the initial product which passes into a colloidally dispersed form and probably is a hydrated form of dimethylol urea, capable, upon removal of water by distillation and by the final heat treatment of forming a jelly-like mass which finally passes into a transparent, hard, toughened product. In the event the metal in the above reaction is not introduced, a dehydrated product of dimethylol urea which is insoluble in water is formed and will precipitate as a white, opaque magma, which when dried forms a white, opaque rather porous body of no known commercial application.

In the event that the hydrogen ion concentration is reduced to, say $1\times10^{-6}$ the product obtained on distillation will become cloudy, or even opaque upon cooling, probably due to the separation of dimethylol urea. This action is undesirable for the production of transparent products. It can be readily seen from this, that the method described has an unusual advantage in that the most desirable hydrogen ion concentration is obtained without any special precaution, it being only necessary to have an excess of zinc or other suitable metal present, and the desired hydrogen ion concentration is obtained whether the boiling is continued for a long or short time and independently of the amount of metal used, provided only there is an excess thereof. In this process when large amounts of urea and formaldehyde are condensed, it is desirable to effect the distillation under reduced pressure in order to increase the amount of uncombined water which is eliminated before the product becomes too viscous, but this is not absolutely necessary.

*Process 2*

To 100 parts of commercial formaldehyde is added 1 part of manganese acetate and after solution 25 parts of urea are added. The solution is then heated to boiling, cooled and 10 parts more of urea are added. The solution is then distilled at either atmospheric or reduced pressure until substantially all of the uncombined water has been removed. The residue from the distillation is cast and heated as described under Process No. 1.

The addition of the amount of manganese acetate specified reduces the hydrogen ion concentration from $1\times10^{-3}$ to $1\times10^{-5.2}$. Of course, more manganese acetate may be used, say 3 parts, in which case the hydrogen ion concentration is reduced to $1\times10^{-5.5}$. In this case, before all the water has been distilled it is necessary to add sufficient acid to increase the hydrogen ion concentration to $1\times10^{-5.0}$ to avoid turbidity in the final product. In case a turbid product were desired, the addition of the acid would not be necessary.

Lead acetate (neutral) may be substituted for manganese acetate in the above process. It is necessary, however, to use a greater amount of the lead salt to obtain the same reduction of hydrogen ion concentration. This is probably because of the greater molecular weight of lead acetate as compared to manganese acetate. A slight turbidity is usually encountered when lead acetate is used due to the formation of insoluble lead carbonate by reaction with dissolved carbon dioxide which all but specially prepared waters contain.

It is interesting to note in connection with this process that manganese acetate and lead acetate are neutral salts, that of manganese for example in 10% solution having a hydrogen ion concentration of substantially $1\times10^{-6.9}$. It is plain to see that the two processes above described have in common, the fact that the condensation products are obtained at the same hydrogen ion concentration, namely, approximately $1\times10^{-5}$. It is also obvious that were there any other method to be discovered whereby the hydrogen ion concentration could be reduced to $1\times10^{-5}$ similar results would be obtained, therefore, it is within the scope of my invention to include all such methods, the above methods being given only by way of example and as illustrating methods by which my invention may be practiced.

Among the other methods of arriving at the proper concentration, is for example, the addition of alkali in sufficient amount to produce the hydrogen ion concentration of $1 \times 10^{-5}$, but not to neutralize the solution.

Among the advantages which are realized in practicing my invention over other known processes in the art, are: first, that in the event formaldehyde is used, the amount of water to be distilled off is quite materially reduced and second, clear solutions obtained as the result of the initial reaction are quite stable and may be kept indefinitely without the addition of any stabilizing agents, this not being the case of products made with an alkaline condensing agent which require that they be neutralized exactly with an acid or that an addition of a retarding agent such as sodium acetate or sodium borate be made to keep the product from increasing spontaneously in viscosity; third, according to my processes, a product is formed which has a comparatively small amount of salts, alkalis or strong acids present which are highly undesirable for some purposes; fourth, the curing of the product to a non-vesicular mass to a great extent is facilitated by the very small ratio of formaldehyde condensed with urea in the presence of an acid; fifth, distillation under reduced pressure is not absolutely necessary as in some cases, but may be desirable for the manufacture of large batches.

In general, the properties of my product are: it is transparent, although it may be rendered opaque or may be colored; it is tough, strong, insoluble in water, but softened by boiling water and infusible in the sense that it does not melt to a liquid, but decomposes in the neighborhood of 400° F. with intumescence.

The term "metal" as used in the foregoing specification and appended claims, is limited to mean those metals which will react with commercial formaldehyde solution to produce a hydrogen ion concentration of $1 \times 10^{-5}$.

Having pointed out and particularly described my invention, what I desire to claim as new is:

1. The process which consists in reacting urea and formaldehyde in the presence of a hydrogen ion concentration of substantially $1 \times 10^{-5}$.

2. The process which consists in reacting urea and formaldehyde in the presence of a solution having a hydrogen ion concentration of substantially $1 \times 10^{-5}$.

3. The process which consists in reacting urea or its derivative and formaldehyde or its polymers in the presence of a hydrogen ion concentration of approximately $1 \times 10^{-5}$.

4. The process which consists in forming a solution of urea, formaldehyde and a substance which will establish a hydrogen ion concentration of approximately $1 \times 10^{-5}$ and reacting said constituents in the presence of said hydrogen ion concentration.

5. The process which consists in heating formaldehyde in the presence of a metal which will react with commercial formaldehyde solution to produce a hydrogen ion concentration of $1 \times 10^{-5}$ and reacting the solution with urea to form a condensation product.

6. The process which consists in heating under a reflux condenser substantially 400 parts by weight of commercial formaldehyde with 5 parts of a metal which will react with commercial formaldehyde solution to produce a hydrogen ion concentration of $1 \times 10^{-5}$ for approximately 2 or 3 minutes, and then cooling the solution and adding 100 parts of urea to form a condensation product.

7. The process which consists in heating under a reflux condenser substantially 400 parts by weight of commercial formaldehyde with 5 parts of a metal which will react with commercial formaldehyde solution to produce a hydrogen ion concentration of $1 \times 10^{-5}$ for approximately 2 or 3 minutes, and then cooling the solution and adding 100 parts of urea and filtering to form a condensation product.

8. The process which consists in heating under a reflux condenser substantially 400 parts by weight of commercial formaldehyde with 5 parts of a metal which will react with commercial formaldehyde solution to produce a hydrogen ion concentration of $1 \times 10^{-5}$ for approximately 2 or 3 minutes, and then cooling the solution and adding 100 parts of urea and filtering and introducing said product into molds and solidifying.

9. The process which consists in heating under a reflux condenser substantially 400 parts by weight of commercial formaldehyde with 5 parts of a metal which will react with commercial formaldehyde solution to produce a hydrogen ion concentration of of $1 \times 10^{-5}$ for approximately 2 or 3 minutes, and then cooling the solution and adding 100 parts of urea and filtering, and introducing said product into molds and solidifying under application of heat.

10. The process which consists in heating under a reflux condenser substantially 400 parts by weight of commercial formaldehyde with 5 parts of a metal which will react with commercial formaldehyde solution to produce a hydrogen ion concentration of $1 \times 10^{-5}$ for approximately 2 or 3 minutes, and then cooling the solution and adding 100 parts of urea and filtering, distilling off a portion of the water present and introducing said product into molds and solidifying under application of heat.

11. The process which consists in heating under a reflux condenser substantially 400 parts by weight of commercial formaldehyde with 5 parts of a metal which will react with commercial formaldehyde solution to produce a hydrogen ion concentration of $1\times10^{-5}$ for approximately 2 or 3 minutes and then cooling the solution and adding 100 parts of urea, and adding additional urea in small portions.

12. The process which consists in heating under a reflux condenser substantially 400 parts by weight of commercial formaldehyde with 5 parts of a metal which will react with commercial formaldehyde solution to produce a hydrogen ion concentration of $1\times10^{-5}$ for approximately 2 or 3 minutes and then cooling the solution and adding 100 parts of urea, and adding additional urea in small portions of substantially 20 parts each, each portion introduced after ebullition ceases, caused by the introduction of the preceding portion.

13. The process which consists in reacting commercial formaldehyde and urea in the presence of zinc to form a condensation product.

14. The process which consists in heating commercial formaldehyde in the presence of zinc and reacting the solution with urea to form a condensation product.

15. The product formed by the process of reacting urea and formaldehyde in the presence of a hydrogen ion concentration of approximately $1\times10^{-5}$.

16. The product formed by the process of reacting urea and commercial formaldehyde in the presence of a metal which will react with commercial formaldehyde solution to produce a hydrogen ion concentration of $1\times10^{-5}$.

17. The product formed by the process of reacting urea and commercial formaldehyde in the presence of zinc.

18. The product formed by the process which consists in heating commercial formaldehyde in the presence of a metal which will react with commercial formaldehyde solution to produce a hydrogen ion concentration of $1\times10^{-5}$ and reacting the solution with urea to form a condensation product.

19. The product formed by the process which consists in heating commercial formaldehyde in the presence of zinc and reacting the solution with urea to form a condensation product.

20. The product formed by the process which consists in heating under a reflux condenser substantially 400 parts by weight of commercial formaldehyde with 5 parts of a metal which will react with commercial formaldehyde solution to produce a hydrogen ion concentration of $1\times10^{-5}$ for approximately 2 or 3 minutes, and then cooling the solution and adding 100 parts of urea to form a condensation product.

21. That step in the process of forming products by reacting urea or its derivatives with formaldehyde which consists in conducting the initial reaction of urea or its derivatives and formaldehyde in the presence of a hydrogen ion concentration of substantially $1\times10^{-5}$.

22. The process of forming products by reacting urea or its derivatives with formaldehyde which consists in forming a solution of urea or its derivatives and formaldehyde having a hydrogen ion concentration of substantially $1\times10^{-5}$ and heat treating said solution to produce a reaction.

23. The process of forming products by reacting urea or its derivatives with formaldehyde which consists in forming a solution of urea or its derivatives and formaldehyde having a hydrogen ion concentration of substantially $1\times10^{-5}$ and heat treating said solution to produce a colloidal mass while maintaining a hydrogen ion concentration of substantially $1\times10^{-5}$.

24. The process which consists in reacting urea and formaldehyde in the presence of a hydrogen ion concentration of substantially $1\times10^{-5}$, said concentration being produced by employing a metal which will react to form a formate, introduced in such quantity as will assure said hydrogen ion concentration.

Signed at Chicago, Illinois, this 19th day of May, 1927.

OSCAR A. CHERRY.